United States Patent
Nakahara et al.

(10) Patent No.: US 9,681,422 B2
(45) Date of Patent: Jun. 13, 2017

(54) DYNAMIC ADAPTIVE AND NON-ADAPTIVE MODE SWITCHING

(71) Applicant: Microsoft Technology Licensing, LLC, Redmond, WA (US)

(72) Inventors: Mike Nakahara, Kirkland, WA (US); Stanley William Adermann, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 52 days.

(21) Appl. No.: 14/692,221

(22) Filed: Apr. 21, 2015

(65) Prior Publication Data
US 2016/0192328 A1 Jun. 30, 2016

Related U.S. Application Data

(60) Provisional application No. 62/099,031, filed on Dec. 31, 2014.

(51) Int. Cl.
*H04J 3/00* (2006.01)
*H04W 72/02* (2009.01)
(Continued)

(52) U.S. Cl.
CPC ....... *H04W 72/02* (2013.01); *H04W 72/0446* (2013.01); *H04W 72/082* (2013.01);
(Continued)

(58) Field of Classification Search
CPC ............. H04W 72/02; H04W 72/0446; H04W 72/082; H04W 88/06; H04W 76/048
(Continued)

(56) References Cited

U.S. PATENT DOCUMENTS 8,411,626 B2 4/2013 Kuo
8,774,209 B2 7/2014 Sadek et al.
(Continued)

FOREIGN PATENT DOCUMENTS

WO 2013067668 A1 5/2013
WO 2013189016 A1 12/2013

OTHER PUBLICATIONS

"Harmonized European Standard", Draft ETSI EN 300 328 V1.8.9, European Telecommunications Standards Institute, Retrieved on Nov. 21, 2014, 90 pages.
ISA European Patent Office, International Search Report and Written Opinion Issued in Application No. PCT/US2015/064174, Feb. 18, 2016, WIPO, 12 pages.
"IEEE802.11ac: The Next Evolution of Wi-FiTM Standards", Published on: May 2012 Available at: https://www.qualcomm.com/media/documents/files/ieee802-11ac-the-next-evolution-of-wi-fi.pdf.
(Continued)

*Primary Examiner* — Sai-Ming Chan
(74) *Attorney, Agent, or Firm* — Alleman Hall Creasman & Tuttle LLP

(57) ABSTRACT

A method of operating a transceiver may comprise operating in an adaptive mode in which transmissions from the transceiver are halted after detection of interference, performing a clear channel assessment (CCA), as a result of the CCA, detecting energy from an interferer above a predetermined threshold, and switching operation to a non-adaptive mode in which the transceiver is configured to alternate transmission periods and idle periods according to a duty cycle. Then, the method may comprise performing an energy detect, as a result of the energy detect, subsequently detecting the energy from the interferer below the predetermined threshold, and switching operation to the adaptive mode.

16 Claims, 6 Drawing Sheets

DUTY CYCLE SWITCHING

(51) Int. Cl.
*H04W 72/04* (2009.01)
*H04W 72/08* (2009.01)
*H04W 76/04* (2009.01)
*H04W 88/06* (2009.01)
*H04W 84/12* (2009.01)
*H04W 74/08* (2009.01)

(52) U.S. Cl.
CPC ...... *H04W 76/048* (2013.01); *H04W 74/0816* (2013.01); *H04W 84/12* (2013.01); *H04W 88/06* (2013.01)

(58) Field of Classification Search
USPC .......................................................... 370/336
See application file for complete search history.

(56) References Cited

U.S. PATENT DOCUMENTS

| | | |
|---|---|---|
| 2012/0093061 A1 | 4/2012 | Charbit et al. |
| 2012/0188881 A1 | 7/2012 | Ma et al. |
| 2013/0203458 A1 | 8/2013 | Charbit et al. |
| 2014/0220996 A1 | 8/2014 | Kim et al. |
| 2015/0133185 A1* | 5/2015 | Chen ................ H04W 72/1215 455/552.1 |
| 2015/0230105 A1* | 8/2015 | Negus ................ H04B 7/0408 370/329 |

OTHER PUBLICATIONS

Meihofer, Eric, "Enhancing ISM Band Performance Using Adaptive Frequency Hopping", In White PaperRetrieved on: Nov. 21, 2014, 10 pages.

Alberty, et al, "Adaptive Coding and Modulation for the Dvb-S2 Standard Interactive Applications: Capacity Assessment and Key System Issues", In IEEE Wireless Communications, Aug. 2007, pp. 2-11.

Xu, et al., "Analytical QoE Models for Bit-Rate Switching in Dynamic Adaptive Streaming Systems", In IEEE Transactions on Mobile Computing, vol. 13, Issue 12, Feb. 25, 2014, 15 pages.

"An RF Power Measurement Solution for Multi-antenna MIMO Transmissions", Retrieved on: Nov. 21, 2014 Available at: cp.literature.agilent.com/litweb/pdf/5991-3097EN.pdf.

Matinmikko, et al., "Cooperative Spectrum Occupancy Measurements in the 2.4 GHz ISM Band",In 3rd International Symposium on Applied Sciences in Biomedical and Communication Technologies, Nov. 7, 2010, 5 pages.

Mattyb, "Changes to ETSI EN 300 328 for 2.4GHz devices—impact in the EU?", Published on: Apr. 2, 2014 Available at: http://www.rcgroups.com/forums/showthread.php?t=2138241.

"ETSI EN 300 328 V1.8.1 (Jun. 2012)", Retrieved on: Dec. 1, 2014 Available at: http://www.etsi.org/deliver/etsi_en/300300_300399/300328/01.08.01_60/en_300328v010801p.pdf.

IPEA European Patent Office, International Preliminary Report on Patentability Issued in PCT Application No. PCT/US2015/064174, Nov. 21, 2016, WIPO, 7 pages.

* cited by examiner

DYNAMIC ADAPTIVE AND NON-ADAPTIVE MODE SWITCHING

CROSS REFERENCE TO RELATED APPLICATION

This application claims priority to U.S. provisional patent application, Ser. No. 62/099,031, entitled "DYNAMIC ADAPTIVE AND NON-ADAPTIVE MODE SWITCHING" filed on Dec. 31, 2014, the entire disclosure of which is herein incorporated by reference.

BACKGROUND

Data can be wirelessly transmitted between computing devices equipped with wireless transceivers, using a variety of wireless transmission protocols over a range of frequencies. Various factors affect the availability of frequency spectrum used in the transmission of data, including transmissions and noise emitted from other electronic devices. When a sending computing device attempts to transmit data to a receiving computing device using a frequency that is occupied by such noise or data transmissions of other devices, then interference may result, which can make it difficult or impossible for a receiving device to properly receive the transmission.

SUMMARY

A method of operating a transceiver is provided. The method may comprise operating in an adaptive mode in which transmissions from the transceiver are halted after detection of interference, performing a clear channel assessment (CCA), as a result of the CCA, detecting energy from an interferer above a predetermined threshold, and in response to the detection, switching operation to a non-adaptive mode in which the transceiver is configured to alternate transmission periods and idle periods according to a duty cycle. Then, the method may comprise performing an energy detect, as a result of the energy detect, subsequently detecting the energy from the interferer below the predetermined threshold, and in response to the subsequent detection, switching operation to the adaptive mode.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Radio devices using the 2.4 GHz radio frequency band may include an adaptivity mechanism to ensure fair usage of the band. When such a device detects another device's transmissions occupying the band, the adaptivity mechanism allows the first device to pause transmissions while the band is occupied. Fair usage of the 2.4 GHz band is regulated for some devices in some jurisdictions. In these jurisdictions, one technique to coordinate transmissions on a crowded channel is for devices to detect noise on the channel and stop transmitting and observe a long idle period while the device occupying the channel continues to transmit. If the transmitting device follows the channel sharing regime established by the regulations, then the device will eventually stop transmitting and yield the spectrum to other devices. However, some devices generate noise in the band without observing the fair usage regime of the regulations. If compliant devices stop transmitting and yield spectrum to such non-compliant devices, the non-compliant devices can unfairly occupy the channel for an excessively long period of time, thus resulting in the undesirable outcome that compliant devices are unfairly kept from transmitting due to noise on the channel for an excessively long period of time. This can result in dropped connections both at the wireless link level and at higher protocol levels, such as TCP, etc., which degrades the overall user experience of the device.

Figure 1:
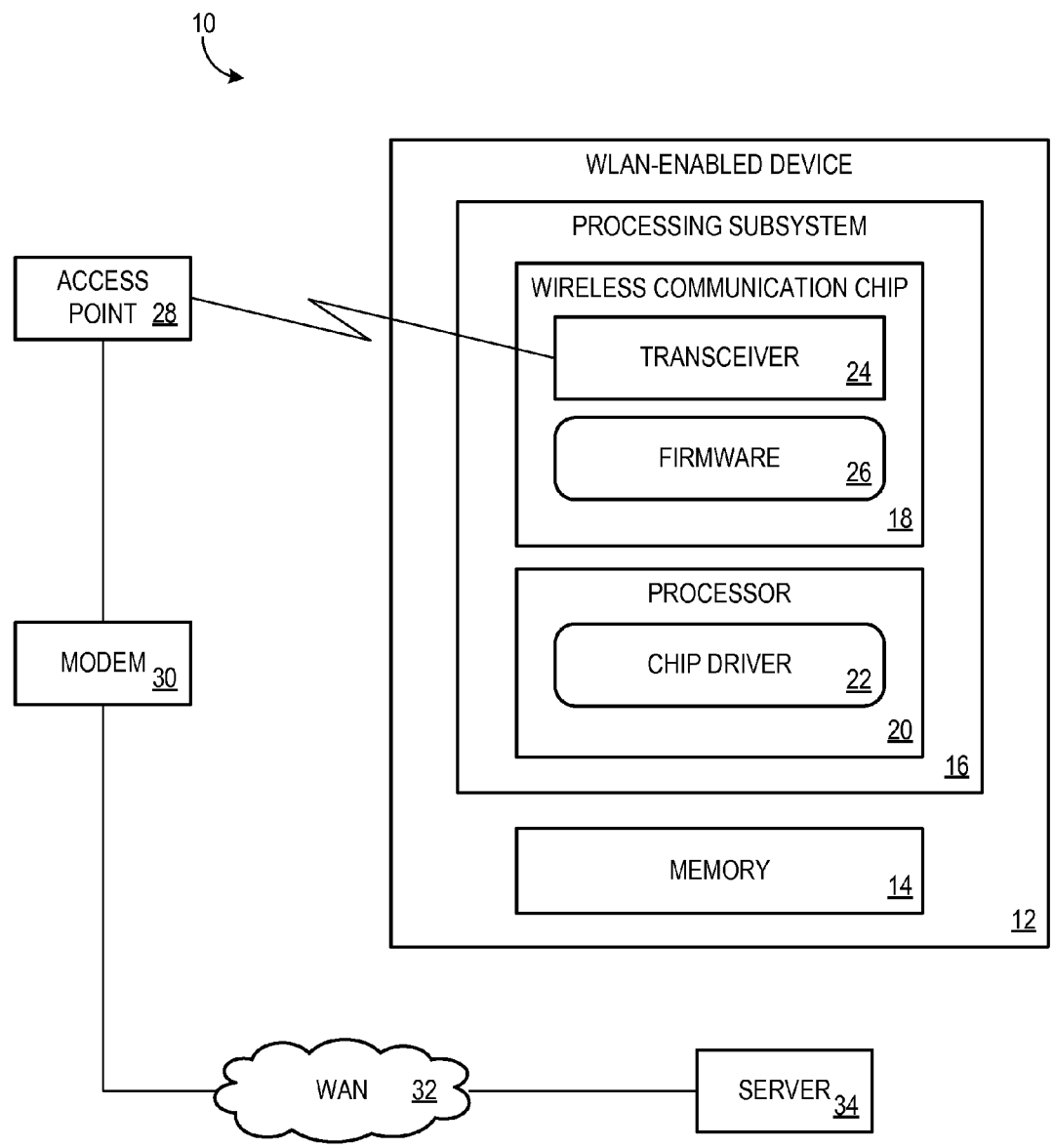
FIG. 1 shows a simplified schematic diagram of an embodiment of a WLAN-enabled device in a wireless system.

FIG. 1 shows a simplified schematic diagram of a wireless local area network (WLAN)-enabled device 12 in a wireless system 10. The WLAN-enabled device 12 may comprise memory 14 and a processing subsystem 16. The processing subsystem 16 may comprise a wireless communication chip 18 and a processor 20 configured to execute a chip driver 22. The wireless communication chip 18 may comprise a transceiver 24 and firmware 26. The transceiver 24 may be configured to send and receive transmissions within the 2.4 GHz radio frequency band at an access point 28 to connect to a modem 30. Through the modem 30, the transceiver 24 may connect to a wide area network (WAN) 32. Also connected to the WAN 32 may be a server 34.

Figure 2:
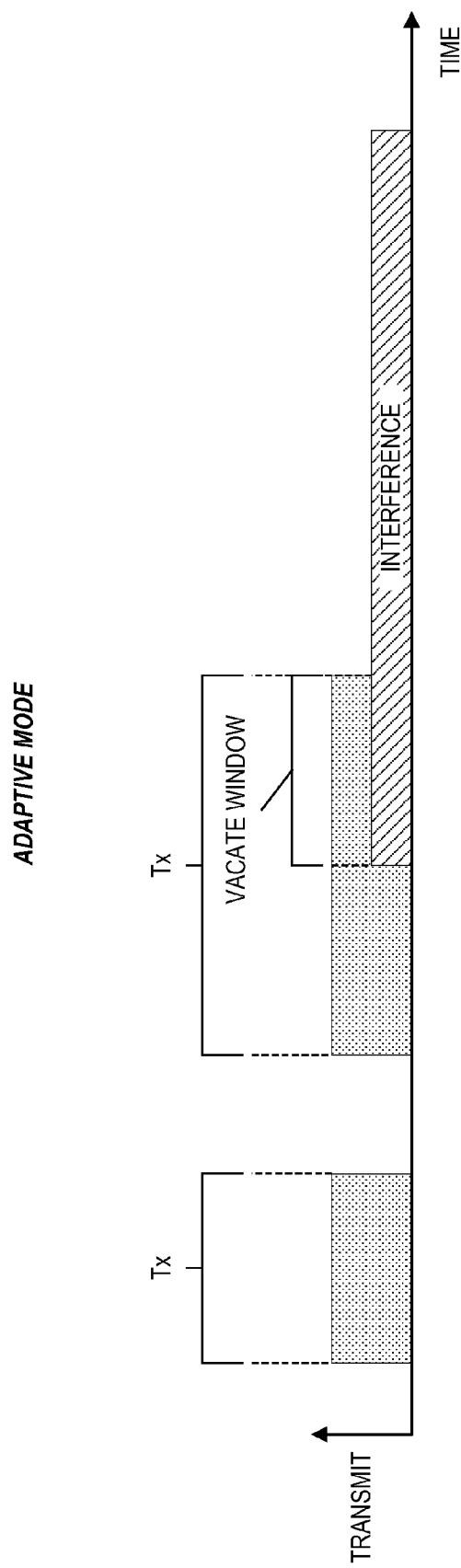
FIG. 2 is a graph illustrating packet transmission over time in an adaptive mode of the wireless system of FIG. 1.
Figure 3:
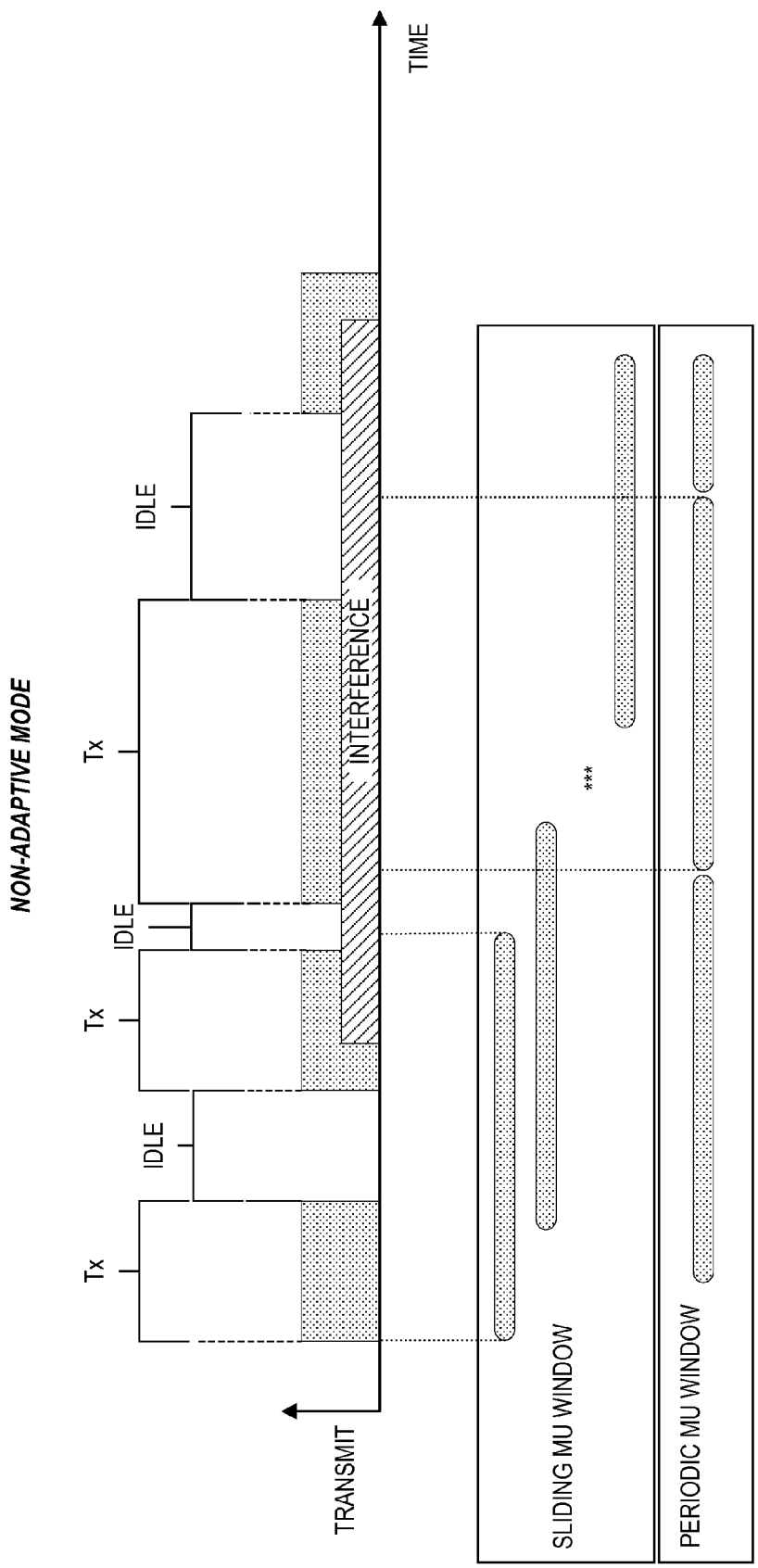
FIG. 3 is a graph illustrating packet transmission over time in a non-adaptive mode as well as sliding and periodic medium utilization windows, of the wireless system of FIG. 1.

The processing subsystem 16 may be configured to operate the transceiver 24 in an adaptive mode in which transmissions are halted after detection of interference. FIG. 2 is a graph illustrating packet transmission over time in the adaptive mode, wherein the vertical axis represents transmissions of packets the horizontal axis represents time. FIG. 2 shows two transmissions Tx from the WLAN-enabled device 12. However, the band may be shared by multiple devices. The processing subsystem 16 may be configured to perform a clear channel assessment (CCA) in which the processing subsystem 16 checks the current energy level of the 2.4 GHz band. The processing subsystem 16 may be configured to, as a result of the CCA, detect energy from an interferer above a predetermined threshold. In FIG. 2, the energy from the interferer is denoted as "INTERFERENCE." Once interference has been detected, the WLAN-enabled device has a certain amount of time to vacate the channel, i.e. cease transmission. The WLAN-enabled device may remain quiet until energy levels drop below the predetermined threshold. During this period of time, acknowledgements and short control packets may still be sent as appropriate. As previously mentioned, remaining in adaptive mode and waiting for the interferer to cease or reduce transmissions to below the predetermined threshold may result in the connection of WLAN-enabled device 12 to the WAN 32 or to another device failing due to a timeout, for example, in a higher level protocol. Instead, the processing subsystem 16 may be configured to, in response to the detection, switch operation to a non-adaptive mode in which the transceiver 24 is configured to alternate transmission periods and idle periods according to a duty cycle. Typically, a transmission period comprises one transmission or a sequence of transmissions, and an idle period contains no transmissions. The processing subsystem 16 may be configured to group multiple transmissions into a transmission period in order to minimize the idle periods provided for by ETSI. Any combination of hardcoded instructions on the wireless communication chip 18, the firmware 26, or the chip driver 22 may perform monitoring of the energy level of the band and switching of the transceiver. FIG. 3 is a graph illustrating packet transmission over time in the non-adaptive mode as well as sliding and periodic medium utilization (MU) windows. In the non-adaptive mode, transmissions Tx alternate with idle periods labeled as "IDLE," even when the interference is detected.

The MU window may be a predetermined length of time within which the WLAN-enabled device 12 may not exceed a specified transmission amount, which may be a total amount of time and/or power, in order to enforce fair usage of the 2.4 GHz band. If the periodic MU window is used, each window starts after the previous window ends. If the sliding MU window is used, a new MU window may begin before the previous one ends in order to achieve a greater throughput than with the periodic MU window. In this manner, transmission may still remain below the maximum permissible throughput in any applicable regulation when energy levels exceed the predetermined threshold, and below a higher maximum permissible throughput in any other applicable regulation, such as the 802.11 specifications, when energy levels are below the predetermined threshold.

Figure 4:
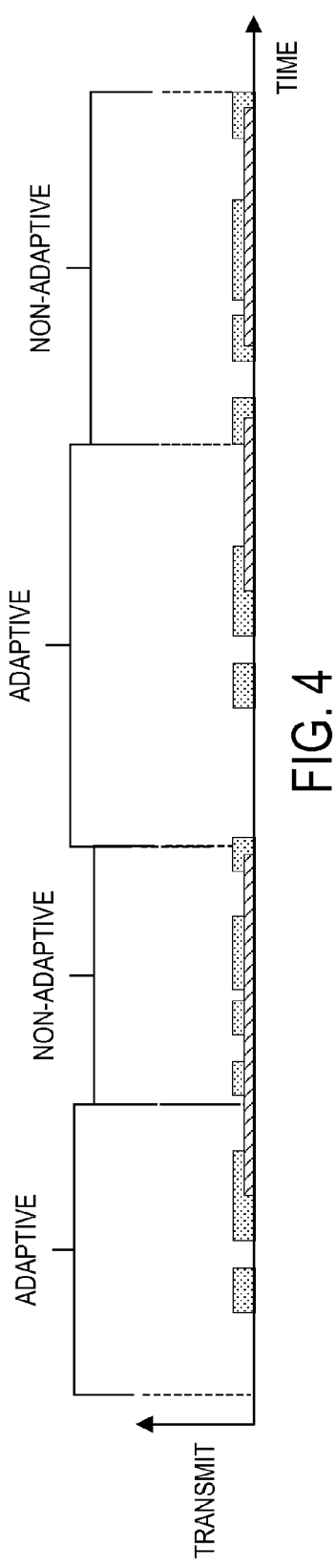
FIG. 4 is a graph illustrating packet transmission over time with dynamic switching between adaptive and non-adaptive modes, in the wireless system of FIG. 1.

FIG. 4 is a graph illustrating packet transmission over time with dynamic switching between adaptive and non-adaptive modes. The processing subsystem 16 may be configured to perform an energy detect. The processing subsystem 16 may be configured to, as a result of the energy detect, subsequently detect the energy from the interferer below the predetermined threshold. The processing subsystem 16 may be configured to, in response to the subsequent detection, switch operation of the transceiver back to the adaptive mode. Each time interference is detected in adaptive mode, the transceiver 24 may be switched to non-adaptive mode until the interference has diminished sufficiently. Choosing the mode that allows the most transmission at a given time under given circumstances may increase the efficiency of the transceiver 24.

Figure 5:
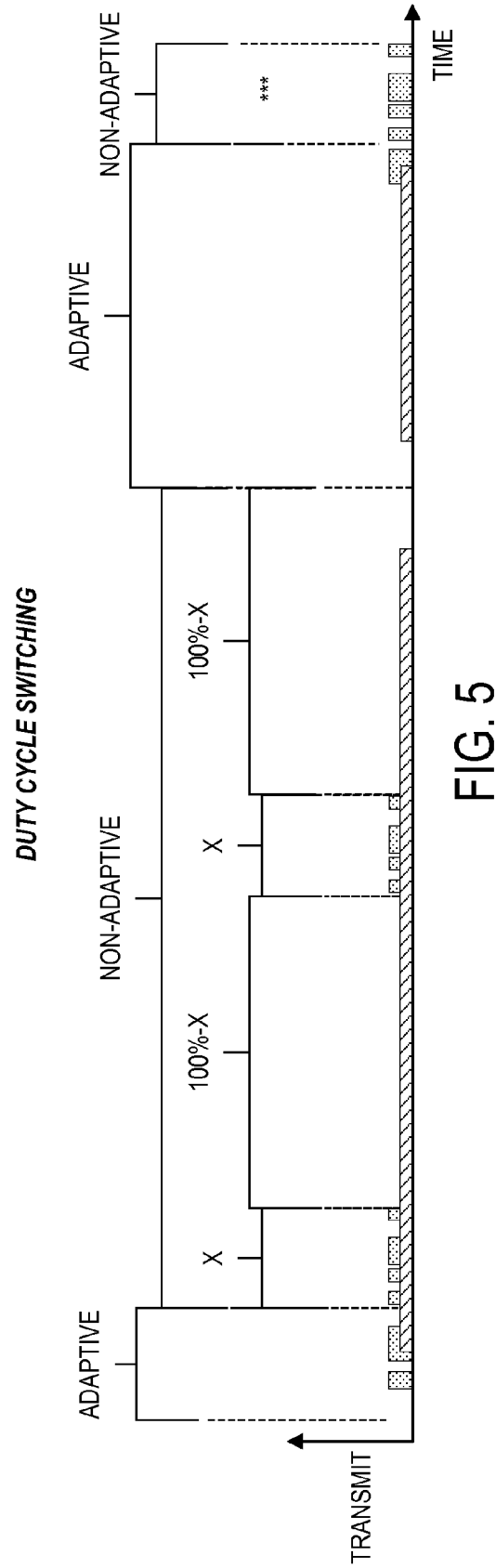
FIG. 5 is a graph illustrating packet transmission over time with duty cycle switching, in the wireless system of FIG. 1.

FIG. 5 is a graph illustrating packet transmission over time with duty cycle switching. The duty cycle may be defined as the ratio (percentage) of the total time spent transmitting in an observation period, which may be one second under ETSI regulations. ETSI may also set a maximum duty cycle depending on transmit power and an absolute maximum independent of transmit power, which may be 50%. In one implementation of the WLAN-enabled device 12, the duty cycle may be calculated according to the following equation:

$$DC = 10^{1-\frac{dBm}{10}} \quad (1)$$

where DC is the duty cycle as a decimal and dBm is the transmit power in milliwatt decibels. Thus, a transmit power of 13 dBm may correspond to a duty cycle of 50%, the maximum allowed under ETSI regulations, and a transmit power of 20 dBm may correspond to a duty cycle of 10%. In other words, when transmitting at 20 dBm, the transceiver 24 may transmit for 10% of the time and be idle for 90% of the time. ETSI may limit an MU factor (MU) by the following equation:

$$MU = \left(\frac{P}{100 \text{ mW}}\right) \times DC \quad (2)$$

where MU is a measure to quantify the amount of resources (power and time) used by non-adaptive equipment, P is the output power in milliwatts, and DC is again the duty cycle. Choosing the maximum allowed MU factor of 0.1, converting to units of milliwatt decibels for the power, and then solving for DC may give Equation 1 above.

In one implementation, each cycle of the duty cycle, which is the transmission period and idle period combined, may be under 50 milliseconds. This may help reduce latency. Furthermore, ETSI may require a maximum transmission period and a minimum idle period to be equal and within a range of 3.5 to 10 milliseconds. Therefore, in order to increase efficiency, transmission periods may be at least 3.5 milliseconds.

The interferer may be one of a UNIVERSAL SERIAL BUS (USB) 3.0 device, a depth camera, and a second WLAN-enabled device such as a wireless telephone, Digital Enhanced Cordless Telecommunications (DECT) radio device, or Long-Term Evolution (LTE) radio device, or a BLUETOOTH device, to provide a few examples. Devices using USB 3.0 or derivatives thereof may commonly produce interference in the 2.4 GHz band. Other devices that may produce interference may include microwaves if in sufficient proximity.

The WLAN-enabled device may be a console computing device, cell phone or other mobile communication device, personal computer, or mobile computing device such as a laptop, tablet, etc., to provide a few examples.

Figure 6:
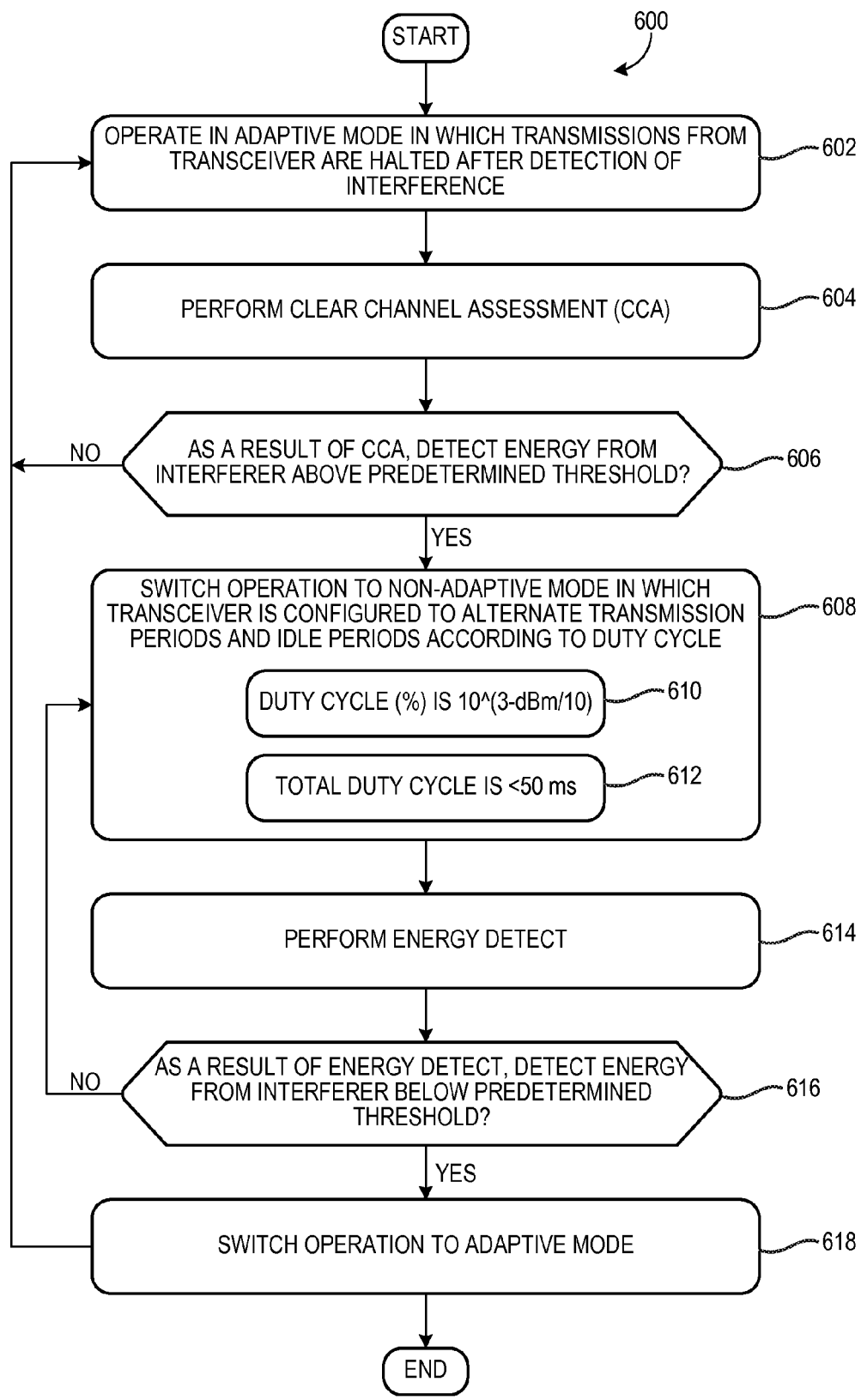
FIG. 6 is a flowchart of an embodiment of a method of operating a transceiver within the WLAN-enabled device.

FIG. 6 is a flowchart of a method of operating a transceiver, which may be within the WLAN-enabled device 12. The following description of method 600 is provided with reference to the software and hardware components of wireless system 10 described above and shown in FIG. 1. It will be appreciated that method 600 may also be performed in other contexts using other suitable hardware and software components.

With reference to FIG. 6, at 602 the method 600 may include operating in an adaptive mode in which transmissions from the transceiver are halted after detection of interference. At 604, the method 600 may include performing a clear channel assessment (CCA). At 606, the method 600 may include, as a result of the CCA, detecting energy from an interferer above a predetermined threshold (YES). If NO, the method 600 may return to 602 and continue to operate in the adaptive mode because no interference above the predetermined threshold has been detected and the WLAN-enabled device is free to transmit. Continuing from YES at 606, at 608, the method 600 may include in response to the detection, switching operation to a non-adaptive mode in which the transceiver is configured to alternate transmission periods and idle periods according to a duty cycle. At 610, the duty cycle may be calculated according to the following equation:

$$DC = 10^{3-\frac{dBm}{10}},$$

where DC is the duty cycle as a percentage and dBm is the transmit power in milliwatt decibels. At 612, the total duty cycle, meaning each cycle of the duty cycle, may be under 50 milliseconds.

At 614, the method 600 may include performing an energy detect. At 616, the method 600 may include deciding if, as a result of the energy detect, the energy from the interferer is subsequently detected at or above the predetermined threshold. If NO, the method 600 may include returning to 608 to continue operating in the non-adaptive mode. Alternatively, if YES at 616, the method 600 may include proceeding to 618 and, in response to the subsequent detection, switching operation to the adaptive mode. After 618, the method 600 may end or else return to 602 to continue in the adaptive mode as part of the dynamic switching cycle. In this manner, when the energy threshold is not met or exceeded, the transceiver may be operated in an adaptive mode, and when the threshold is met or exceeded, the transceiver may be operated in a non-adaptive mode.

In the method 600, the source of the interference, the interferer, may be one of a UNIVERSAL SERIAL BUS (USB) 3.0 device, a depth camera, and a second WLAN-enabled device such as a wireless telephone, Digital Enhanced Cordless Telecommunications (DECT) radio device, or Long-Term Evolution (LTE) radio device, or a BLUETOOTH device. Further, the transceiver may be part of a WLAN-enabled device described above that is a console computing device.

In some embodiments, the methods and processes described herein may be tied to a computing system of one or more computing devices. In particular, such methods and processes may be implemented as a computer-application program or service, an application-programming interface (API), a library, and/or other computer-program product.

Figure 7:
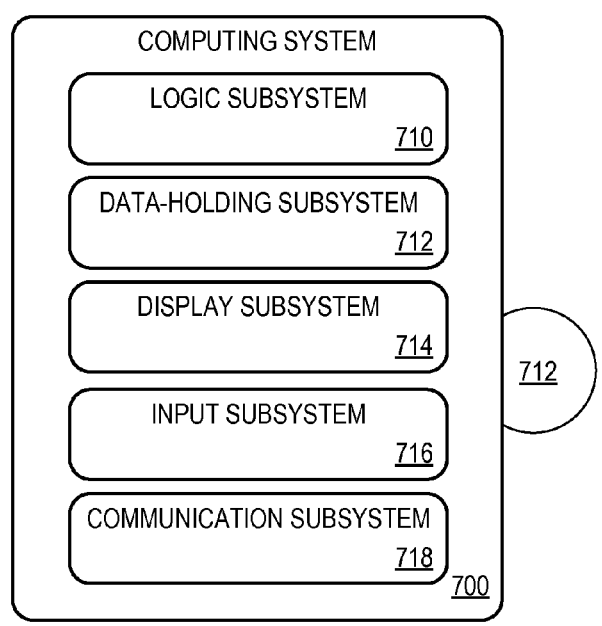
FIG. 7 shows a simplified schematic diagram of an example computing system that may be utilized in the wireless system of FIG. 1.

FIG. 7 schematically shows a non-limiting embodiment of a computing system 700 that can enact one or more of the methods and processes described above. Computing system 700 is shown in simplified form. Computing system 700 may take the form of one or more personal computers, server computers, tablet computers, home-entertainment computers, network computing devices, gaming devices, mobile computing devices, mobile communication devices (e.g., smart phone), and/or other computing devices. The wireless system 10 of FIG. 1 may be one example of computing system 700.

Computing system 700 includes a logic subsystem 710 and a data-holding subsystem 712. Computing system 700 may optionally include a display subsystem 714, input subsystem 716, communication subsystem 718, and/or other components not shown in FIG. 7.

Logic subsystem 710 includes one or more physical devices configured to execute instructions. For example, the logic subsystem may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic subsystem may include one or more processors configured to execute software instructions. Additionally or alternatively, the logic subsystem may include one or more hardware or firmware logic subsystems configured to execute hardware or firmware instructions. Processors of the logic subsystem may be single-core or multi-core, and the instructions executed thereon may be configured for sequential, parallel, and/or distributed processing. Individual components of the logic subsystem optionally may be distributed among two or more separate devices, which may be remotely located and/or configured for coordinated processing. Aspects of the logic subsystem may be virtualized and executed by remotely accessible, networked computing devices configured in a cloud-computing configuration.

Data-holding subsystem 712 includes one or more physical devices configured to hold instructions executable by the logic subsystem to implement the methods and processes described herein. When such methods and processes are implemented, the state of data-holding subsystem 712 may be transformed—e.g., to hold different data.

Data-holding subsystem 712 may include removable and/or built-in devices. Data-holding subsystem 712 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Data- holding subsystem 712 may include volatile, nonvolatile, dynamic, static, read/write, read-only, random-access, sequential-access, location-addressable, file-addressable, and/or content-addressable devices.

It will be appreciated that data-holding subsystem 712 includes one or more physical devices. However, aspects of the instructions described herein alternatively may be propagated by a communication medium (e.g., an electromagnetic signal, an optical signal, etc.) that is not held by a physical device for a finite duration.

Aspects of logic subsystem 710 and data-holding subsystem 712 may be integrated together into one or more hardware-logic components. Such hardware-logic components may include field-programmable gate arrays (FPGAs), program-and application-specific integrated circuits (PASIC/ASICs), program-and application-specific standard products (PSSP/ASSPs), system-on-a-chip (SOC), and complex programmable logic devices (CPLDs), for example.

The terms "module," "program," and "engine" may be used to describe an aspect of computing system 700 implemented to perform a particular function. In some cases, a module, program, or engine may be instantiated via logic subsystem 710 executing instructions held by data-holding subsystem 712. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 714 may be used to present a visual representation of data held by data-holding subsystem 712. This visual representation may take the form of a graphical user interface (GUI). As the herein described methods and processes change the data held by the data-holding subsystem, and thus transform the state of the data-holding subsystem, the state of display subsystem 714 may likewise be transformed to visually represent changes in the underlying data. Display subsystem 714 may include one or more display devices utilizing virtually any type of technology. Such display devices may be combined with logic subsystem 710 and/or data-holding subsystem 712 in a shared enclosure, or such display devices may be peripheral display devices.

When included, input subsystem 716 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board.

When included, communication subsystem 718 may be configured to communicatively couple computing system 700 with one or more other computing devices. Communication subsystem 718 may include wired and/or wireless communication devices compatible with one or more different communication protocols. As non-limiting examples, the communication subsystem may be configured for communication via a wireless telephone network, or a wired or wireless local-or wide-area network. In some embodiments, the communication subsystem may allow computing system 700 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The subject matter of the present disclosure is further described in the following paragraphs. One aspect provides a method of operating a transceiver, the method comprising, operating in an adaptive mode in which transmissions from the transceiver are halted after detection of interference, performing a clear channel assessment (CCA), as a result of the CCA, detecting energy from an interferer above a predetermined threshold, and in response to the detection, switching operation to a non-adaptive mode in which the transceiver is configured to alternate transmission periods and idle periods according to a duty cycle. According to this aspect, the method may further include performing an energy detect, as a result of the energy detect, subsequently detecting the energy from the interferer below the predetermined threshold. In this aspect, the method may additionally or alternatively include, in response to the subsequent detection, switching operation to the adaptive mode. In this aspect, the method may additionally or alternatively include that the duty cycle is determined based on the following equation, $$DC = 10^{1-\frac{dBm}{10}}$$

where DC is the duty cycle as a decimal and dBm is the transmit power in milliwatt decibels. The method may additionally or alternatively include the duty cycle is 10%. The method may additionally or alternatively include each cycle of the duty cycle is under 50 milliseconds. The method may additionally or alternatively include the interferer is one of a UNIVERSAL SERIAL BUS (USB) 3.0 device, a depth camera, or a WLAN-enabled device. The method may additionally or alternatively include the transceiver is part of a WLAN-enabled device. The method may additionally or alternatively include the WLAN-enabled device is a computing device. The method may additionally or alternatively include the computing device is a console computing device, mobile computing device, mobile communication device, or personal computer.

Another aspect provides a wireless local area network (WLAN)-enabled device comprising memory and a processing subsystem, the processing subsystem comprising a wireless communication chip and a processor configured to execute a chip driver, the wireless communication chip comprising a transceiver and firmware, wherein the processing subsystem is configured to operate the transceiver in an adaptive mode in which transmissions are halted after detection of interference, perform a clear channel assessment (CCA), as a result of the CCA, detect energy from an interferer above a predetermined threshold, and in response to the detection, switch operation to a non-adaptive mode in which the transceiver is configured to alternate transmission periods and idle periods according to a duty cycle. In this aspect, the processing subsystem may further be configured to perform an energy detect, as a result of the energy detect, subsequently detect the energy from the interferer below the predetermined threshold. In this aspect, the processing subsystem may further be configured to, in response to the subsequent detection, switch operation of the transceiver to the adaptive mode. The WLAN-enabled device may additionally or alternatively be configured so that the duty cycle is determined based on the following equation, $$DC = 10^{1-\frac{dBm}{10}}$$

where DC is the duty cycle as a decimal and dBm is the transmit power in milliwatt decibels. The WLAN-enabled device may additionally or alternatively include that the duty cycle is 10%. The WLAN-enabled device may additionally or alternatively include that each cycle of the duty cycle is under 50 milliseconds. The WLAN-enabled device may additionally or alternatively include that the interferer is one of a UNIVERSAL SERIAL BUS (USB) 3.0 device, a depth camera, or a second WLAN-enabled device. The WLAN-enabled device may additionally or alternatively include the WLAN-enabled device is a console computing device. The WLAN-enabled device may additionally or alternatively include the computing device is a console computing device, mobile computing device, mobile communication device, or personal computer.

Another aspect provides wireless local area network (WLAN)-enabled device comprising memory and a processing subsystem, the processing subsystem comprising a wireless communication chip and a processor configured to execute a chip driver, the wireless communication chip comprising a transceiver and firmware, wherein the processing subsystem is configured to operate the transceiver in an adaptive mode in which transmissions are halted after detection of interference, perform a clear channel assessment (CCA), as a result of the CCA, detect energy from an interferer above a predetermined threshold, in response to the detection, switch operation to a non-adaptive mode in which the transceiver is configured to alternate transmission periods and idle periods according to a duty cycle, perform an energy detect, as a result of the energy detect, subsequently detect the energy from the interferer below the predetermined threshold, and in response to the subsequent detection, switch operation of the transceiver to the adaptive mode, wherein the WLAN-enabled device is a computing device, and the duty cycle is determined based at least on the following equation:

$$DC = 10^{1-\frac{dBm}{10}}$$

where DC is the duty cycle as a decimal and dBm is the transmit power in milliwatt decibels.

The invention claimed is:

1. A method of operating a transceiver, the method comprising:
   operating in an adaptive mode in which transmissions from the transceiver are halted after detection of interference;
   performing a clear channel assessment (CCA);
   as a result of the CCA, detecting energy from an interferer above a predetermined threshold;
   in response to the detection, switching operation to a non-adaptive mode in which the transceiver is configured to alternate transmission periods and idle periods according to a duty cycle;
   subsequent to switching operation to the non-adaptive mode, performing an energy detect;
   as a result of the energy detect, subsequently detecting the energy from the interferer below the predetermined threshold; and
   in response to the subsequent detection, switching operation to the adaptive mode.

2. The method of claim 1, wherein the duty cycle is determined based at least on the following equation:

$$DC = 10^{1-\frac{dBm}{10}}$$

where DC is the duty cycle as a decimal and dBm is the transmit power in milliwatt decibels.

3. The method of claim 2, wherein the duty cycle is 10%.

4. The method of claim 1, wherein each cycle of the duty cycle is under 50 milliseconds.

5. The method of claim 1, wherein the interferer is one of a UNIVERSAL SERIAL BUS (USB) 3.0 device, a depth camera, or a WLAN-enabled device.

6. The method of claim 1, wherein the transceiver is part of a WLAN-enabled device.

7. The method of claim 1, wherein the WLAN-enabled device is a computing device.

8. The method of claim 7, wherein the computing device is a console computing device, mobile computing device, mobile communication device, or personal computer.

9. A wireless local area network (WLAN)-enabled device comprising memory and a processing subsystem, the processing subsystem comprising a wireless communication chip and a processor configured to execute a chip driver, the wireless communication chip comprising a transceiver and firmware, wherein the processing subsystem is configured to:
   operate the transceiver in an adaptive mode in which transmissions are halted after detection of interference;
   perform a clear channel assessment (CCA);
   as a result of the CCA, detect energy from an interferer above a predetermined threshold;
   in response to the detection, switch operation to a non-adaptive mode in which the transceiver is configured to alternate transmission periods and idle periods according to a duty cycle;
   subsequent to switching operation to the non-adaptive mode, perform an energy detect;
   as a result of the energy detect, subsequently detect the energy from the interferer below the predetermined threshold; and
   in response to the subsequent detection, switch operation to the adaptive mode.

10. The WLAN-enabled device of claim 9, wherein the duty cycle is determined based at least on the following equation:

$$DC = 10^{1-\frac{dBm}{10}}$$

where DC is the duty cycle as a decimal and dBm is the transmit power in milliwatt decibels.

11. The WLAN-enabled device of claim 10, wherein the duty cycle is 10%.

12. The WLAN-enabled device of claim 9, wherein each cycle of the duty cycle is under 50 milliseconds.

13. The WLAN-enabled device of claim 9, wherein the interferer is one of a UNIVERSAL SERIAL BUS (USB) 3.0 device, a depth camera, or a second WLAN-enabled device.

14. The WLAN-enabled device of claim 9, wherein the WLAN-enabled device is a computing device.

15. The WLAN-enabled device of claim 9, wherein the computing device is a console computing device, mobile computing device, mobile communication device, or personal computer.

16. A wireless local area network (WLAN)-enabled device comprising memory and a processing subsystem, the processing subsystem comprising a wireless communication chip and a processor configured to execute a chip driver, the wireless communication chip comprising a transceiver and firmware, wherein the processing subsystem is configured to:
   operate the transceiver in an adaptive mode in which transmissions are halted after detection of interference;
   perform a clear channel assessment (CCA);
   as a result of the CCA, detect energy from an interferer above a predetermined threshold;
   in response to the detection, switch operation to a non-adaptive mode in which the transceiver is configured to alternate transmission periods and idle periods according to a duty cycle;
   subsequent to switching operation to the non-adaptive mode, perform an energy detect;

as a result of the energy detect, subsequently detect the energy from the interferer below the predetermined threshold; and in response to the subsequent detection, switch operation of the transceiver to the adaptive mode; wherein the WLAN-enabled device is a computing device; and the duty cycle is determined based at least on the following equation:

$$DC = 10^{1-\frac{dBm}{10}}$$

where DC is the duty cycle as a decimal and dBm is the transmit power in milliwatt decibels.

* * * * *